United States Patent [19]
Bernard et al.

[11] 3,883,331
[45] May 13, 1975

[54] FILTER, PARTICULARLY FOR SMOKE SOLIDS FILTRATION

[75] Inventors: Richard A. Bernard, Flossmoor; Arthur A. Bernard, Beecher, both of Ill.

[73] Assignee: Dover Corporation, Memphis, Tenn.

[22] Filed: Jan. 8, 1973

[21] Appl. No.: 321,939

[52] U.S. Cl. .................. 55/381; 55/315; 55/483; 55/500; 55/521; 55/529
[51] Int. Cl. ............................................. B01d 46/02
[58] Field of Search ............ 55/323, 324, 315, 333, 55/334, 363, 387, 483, 484, 500, 521, 529; 210/493

[56] References Cited
UNITED STATES PATENTS

| | | | |
|---|---|---|---|
| 313,028 | 2/1885 | Sprinkel | 55/445 |
| 720,084 | 2/1903 | Thurman | 55/381 |
| 2,993,564 | 7/1961 | Rodenhouse | 55/484 |
| 3,231,094 | 1/1966 | Wiegand | 55/521 |
| 3,606,739 | 9/1971 | Peterson | 55/500 |

Primary Examiner—Bernard Nozick
Attorney, Agent, or Firm—Brumbaugh, Graves, Donohue & Raymond

[57] ABSTRACT

A filter for filtration of a gas to remove particulate material, such as dust and smoke solids, from the gas comprises a filter element that is composed of a multiplicity of generally flat, closed envelopes of a material which is permeable to gas but capable of trapping the particulate material and supporting a layer of the material as a filter bed. The envelopes are interconnected in stacked relation, and are placed in communication with each other, preferably by matching openings in both walls of each envelope. The filter element is preferably received within a housing, and the exterior walls of adjacent envelopes of the filter element are maintained in separated relation, such as by separator plates that subdivide the housing into compartments, each of which receives one envelope of the filter element. The gas to be filtered enters the filter element and is distributed among the envelopes. The particulate material is collected as a layer or bed on each wall of each envelope, and the gas flows out through the envelope walls.

12 Claims, 8 Drawing Figures

FILTER, PARTICULARLY FOR SMOKE SOLIDS FILTRATION

BACKGROUND OF THE INVENTION

The removal of particulate material from a gas has been accomplished in various ways with various degrees of success. For example, relatively large size particulate materials can be removed from a gas in cyclone or similar types of separators that rely upon separation of particulate material from the gas due to relative acceleration forces on the gas and particulate material. Smaller size particles cannot be handled effectively in these types of separators and require filtration or precipitation for removal. Particles of a size down to a few microns may be removed from a gas by filtration through a porous filter medium, such as a fibrous body or a paper or cloth filter element. Among common examples of such types of filters for removing relatively small particulate materials, generally termed "dust," from a gas are the air cleaners employed in the air intake systems of engines, bag-house filters used industrially for dust removal and vacuum cleaner bags made of relatively porous fabric or paper. Very small particles, such as smoke solids, can to some degree be removed by filtration through a porous filtering medium, but are most commonly removed, at least in industry and to an increasing extent by the general public, by electrostatic precipitation. Perhaps the most notable, common example of smoke filtration by a filter medium, rather than by electrostatic precipitation, is found in tobacco smoke filters in the form of bodies or plugs of fibrous material.

Effective removal of very fine material, particularly material that tends to agglomerate or to be sticky, presents considerable difficulty and can be extremely expensive. Ordinarily, relatively large particles of material entrained in a gas can be collected as a layer on the surface of a paper or cloth filter medium, and the medium periodically shaken to dislodge an accumulation of material and to rehabilitate the filter medium for further use. This is the case in conventional bag-house type filters used in industry. On the other hand, very fine particulate material, such as smoke solids, which range anywhere from approximately 0.1 micron up to 1 or 2 microns, are very difficult to trap in a filter medium. For one thing, the particles, because of their small size, tend to penetrate into a paper or cloth filter medium or a fibrous body and clog the filter rather quickly, thereby requiring frequent replacement of the filter medium. Secondly, it is often very difficult to rehabilitate the filter medium, once it has become clogged, since the particles tend to agglomerate as they penetrate into the medium and also tend to form a very dense and relatively gas impermeable layer on the surface of the medium. Accordingly, it is difficult to dislodge an accumulation of smoke solids from a filter medium.

A common form of gas filter used primarily for the removal of dust, but occasionally used in removing smoke solids, is a cartridge-type filter employing a paper filter medium which is deeply corrugated or pleated and is built into a self-contained annular element or cartridge. For example, most air cleaners presently used in the air intakes of internal combustion engines are of this type. The corrugated or pleated filter medium is sandwiched between a pair of annular rings, each of which must be sealed to the edges of the pleated filter medium to ensure against leakage of gas and entrained particulate material. Ordinarily, filtration occurs from outside the annular ring to the inside. The filter, by reason of the large filter area provided by the corrugated or pleated construction of the filter medium, has a reasonably long life under normal conditions, although relatively short lives are encountered in heavy dust conditions, such as road-building equipment. However, the element is very expensive to manufacture, and the expense of employing it is, of course, directly related to the frequency with which the filter cartridge must be replaced. Moreover, the tendency is for the corrugations to be located relatively close to each other so that very little volume is available for accumulation of particulate material, especially at the inner portions of the pleats. The air or other gas drawn into the filter by the generally radial gas flow from outside to inside tends to flow along, rather than transversely to, the surfaces of the pleats of the filter medium, so that most filtration initially occurs at the radially inward portions of the pleats. Consequently, the radially inward portions of the filter tend to clog quickly, and a layer of material builds up gradually between the pleats from the inward portion moving in a radially outward direction. As the accumulation of particulate material builds outwardly from the inner portions of the pleats, the effective filter face area is diminished, and the gas velocity across the filter tendds to increase. The increase in gas velocity, in turn, tends to decrease effectiveness of filtering and causes increasing amounts of particles to penetrate into and clog the filter medium and to become compacted on the surface. Soon after penetration and compaction of particles begins, the filter very quickly deteriorates and must be replaced.

Another disadvantage of cartridge-type filters is that the particulate material accumulates on a filter medium that is radially outwardly exposed. Accordingly, when it is replaced or handled in a dirty condition, it is very difficult to prevent some of the material from dislodging and soiling the hands and clothes of the person servicing the filter and also soiling the environs that it may be in until it is placed in an appropriate receptacle. In other words, changing a cartridge-type filter can be a dirty job. Moreover, disposal of the used filter cartridge type filter is a problem, inasmuch as it normally has rigid elements of metal or plastic and is somewhat bulky. A discarded cartridge filter, therefore, becomes another significant element to be added to the general obnoxious waste of our industrial society.

SUMMARY OF THE INVENTION

There is provided, in accordance with the invention, a novel and improved filter which is particularly well-suited for filtration of smoke and other very fine particulate material entrained in a gas. A filter, in accordance with the invention, comprises a filter element that consists of a multiplicity of generally flat, closed envelopes of a material that is permeable to gas but is capable of capturing particles entrained in the gas. At least one of the envelopes of the filter element has an opening for admission of the gas to be filtered into the interior of the element, and the interiors of all of the envelopes are in communication with each other for distribution of the gas to be filtered among them. The envelopes are joined together in stacked relation, are preferably identical in size, shape and construction, and are preferably arranged in a stack in which the perimeters of all envelopes line up with each other.

In one form of the invention, the filter has a housing that is subdivided into a multiplicity of compartments by separator elements, which may, for example, be plates formed with protuberances extending out from both sides. Each compartment in the housing receives one of the envelopes of the filter element, and the protuberances on the separators engage the walls of the envelopes to hold adjacent envelopes in spaced relation. The protuberances, which may be dome-like bosses, small U-shaped bands or corrugations in the sheet or screen, provide passages for gases passing out of the filter unit to flow through the housing and to and out of the housing outlet. The compartments in the housing are dimensioned so that they permit the individual envelopes to expand under differential pressure across the envelope walls and provide a space within each envelope for accumulation of layers of particulate material on each of the opposite interior walls of the envelope.

In another form of filter, which is functionally the same as the one described above, there are no partitions in the housing, but at least one wall of each of the envelopes of the filter element has protuberances projecting outwardly for engagement with the wall of an adjacent envelope, again to provide a separation between the walls of the envelopes for flow of gases after filtration away from the envelopes.

In a preferred form, the filter element is made up of a number of completely closed envelopes made of porous paper or a conventional filter paper. Appropriate envelopes may be made using conventional bag-making machinery, preferably with modifications for closing the usual open end of the bag. An ordinary flat bag composed of a pair of flat wall panels connected around the entire perimeter of the bag is appropriate. Communication between the envelopes of the unit is preferably provided by aligned openings in each envelope, the perimeters of the openings in adjacent envelopes being sealed to prevent leakage from within the unit. The joinder of the bags into a stack is preferably exclusively in conjuction with the communication openings between the envelopes. For example, adjacent envelopes may be connected by bands of adhesive that surround the aligned openings, the adhesive band not only joining the envelopes to each other, but also forming seals around the matching openings to prevent leakage. If desired, an annular spacer surrounding the matching openings may be provided between adjacent bags.

In an operation of the filter constructed according to the invention, the gas to be filtered is introduced into the interior of the filter element through the one or more inlet openings associated with one or more of the envelopes. The gas to be filtered is distributed among the several envelopes through the communicating paths between them and is filtered through the walls. As will be discussed in more detail below, in a preferred mechanism of filtration employed with the filter, a layer of particles builds up on the inner surface of each wall of each envelope, the layer serving as a filter bed for capturing particles that impinge on it in subsequent filtration. The filtered gas flows out through the filter bed and through the envelope walls. The spaces maintained between the adjacent envelopes allows the filtered gas to flow within the housing outside of the filter unit and to be conducted to the housing outlet or outlets and discharged from the housing.

The filter has numerous advantages over previously known and proposed filters. First of all, the filter element, which is intended to be replaceable at any required interval, is of relatively low cost, particularly compared with the presently available types of filter cartridges. The low cost results from the use of inexpensive material, and the capability of mass production by conventional bag-making machines. The filter element can be flattened or folded into a compact, lightweight body for convenient and relatively inexpensive shipment and storage. The light weight and compact size also facilitate handling in an industrial environment.

In use, it has been found that the filter operates very effectively, even in removing extremely small particles, such as smoke solids. This point is discussed in greater detail below. One important advantage of the filter is the relatively long service life of the filter element, which is due in part to the geometry of the filter element; in particular, the envelopes, over most of their area, provide spaces of uniform thickness for accumulation of layers of particulate material on each of the interior surfaces. The substantially parallel, spaced apart walls of each envelope do not have the disadvantage (discussed above) that is encountered in the corrugated or pleated types of filter element cartridges of entrapment and accumulation of particulate material in a confined, tapered space that quickly fills and clogs. Accordingly, the filter of the invention provides, over a relatively long portion of its useful life, a substantially constant effective filter face area, as distinguished from steady reduction in filter face area encountered in pleated type filter elements. In the filter of the invention, as velocities through the filter remain fairly uniform throughout the service life of the filter. Pressure drop likewise is reasonably stable, subject, of course, to gradual reduction as the particle layer formed on the envelope walls increases in thickness.

The construction of the filter is such that it requires no elaborate sealing between the filter element and other components; on the contrary, the filter element of the present invention is completely closed except for an inlet or inlets for the gas to be filtered. All that is required is a reasonably good seal between the inlet to the filter housing and the inlet to the filter element. Once particulate material enters the closed filter element, it has no escape.

The removal and disposal of a used filter element are accomplished quickly and easily in an essentially "white gloves" operation. Inasmuch as the particulate material collected in the filter is contained entirely within the closed filter element (closed except for the inlet opening or openings), the material cannot be dislodged or be touched by the person servicing the filter. The inlet opening or openings can be taped closed, and the filter element can be picked up and transported with all of the particulate material safely contained within it.

The filter element is preferably made entirely of paper or fabric. In addition to the effectiveness of those materials in filtration, they are of modest cost and permit a used filter element to be compacted so that it is substantially free of void space, thereby reducing its size for transport and disposal. Subject to the possibility that the particulate material may be ecologically harmful, disposal of the filter element with the particulate material still enclosed within it is much less of a problem that with cartridge type filters, which have plastic or metal retainer rings, wire screens and other rigid components that make the device not only bulky but degradable only over a long period of time, if at all. In contrast, a filter element made of paper or fabric will usually be rapidly degradable, which means that disposal in a landfill opertion is appropriate.

The filter may be used in a wide variety of applications. For example, it may be used as an air filter on air compressors, pumps, engine intakes and similar dust-removal type operations. In most instances, a filter, constructed in accordance with the invention, will be of samller overall size and cost than filters. of comparable capacity that are used at present. A relatively small, low cost, long-life filter for household use in a forced air furnace or air conditioning unit may be based on a fractional bypass system in which a portion of the air is conducted through the filter to provide continuous air cleaning.

There is a wide variety of industrial uses for the filter in smoke removal. A notable example of a widespread, difficult industrial smoke problem occurs in arc-welding operations. An arc-welding operation produces on the order of one pound of smoke for every 100 pounds of welding electrode consumed. In a week, a single gun in an arc-welding production operation may generate as much as five pounds or more of smoke solids, the total amount varying, of course, depending upon the sizes of the welding electrodes consumed and the time the gun is used for actual welding operations. Within approximately the last year, further efforts have been made in industry to cut down on the release into the factory building atmosphere of welding smoke by equipping welding guns with a vacuum smoke removal system. Such systems remove the smoke from the immediate environment of the welder, but further removal from the building requires expensive ducts and blowers. Moreover, once the smoke is removed from the building, it still remains for smoke solids and any other contaminants capable of being removed to be removed before discharge into the atmosphere. A filter, according to the present invention, is very well suited for removing the solids from smoke drawn off from an arc-welding operation by a vacuum gun system. The filtered gases released from the filter after filtration may be discharged directly into the building, most of the smoke solids having been removed by the filter prior to discharge. The relatively low cost of the filter makes it economically practical for a filter to be used with each arc-welding gun and for the filter elements to be replaced as required. Smoke removal in an arc-welding operation is, however, merely one example of the utility of a filter, according to the present invention, for industrial, commercial and general consumer use.

For a better understanding of the invention, reference may be made to the following description of exemplary embodiments, taken in conjunction with the figures of the accompanying drawings in which:

DESCRIPTION OF EXEMPLARY EMBODIMENTS

Figure 1:
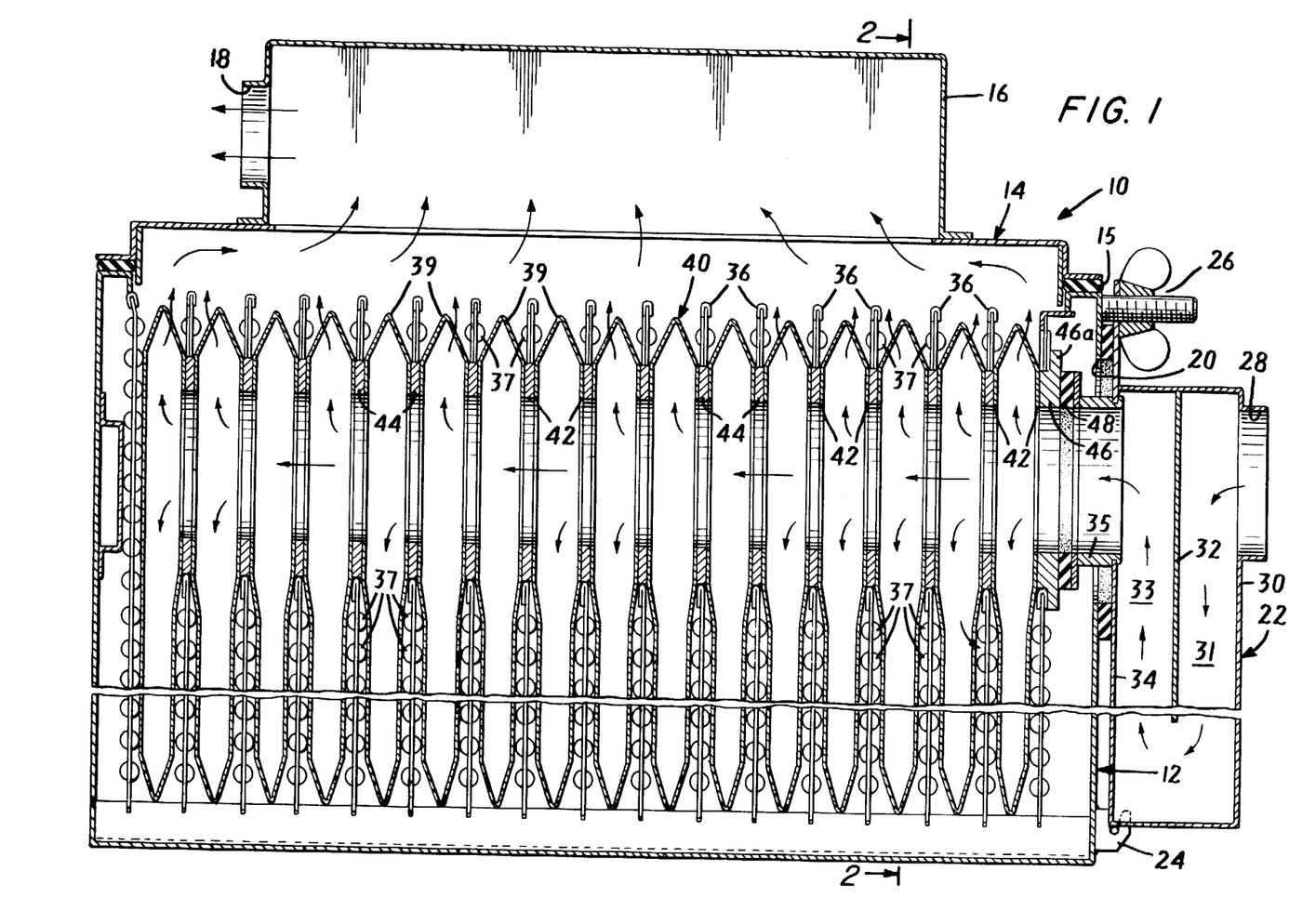
FIG. 1 is an end cross-sectional view of one embodiment of a filter.
Figure 2:
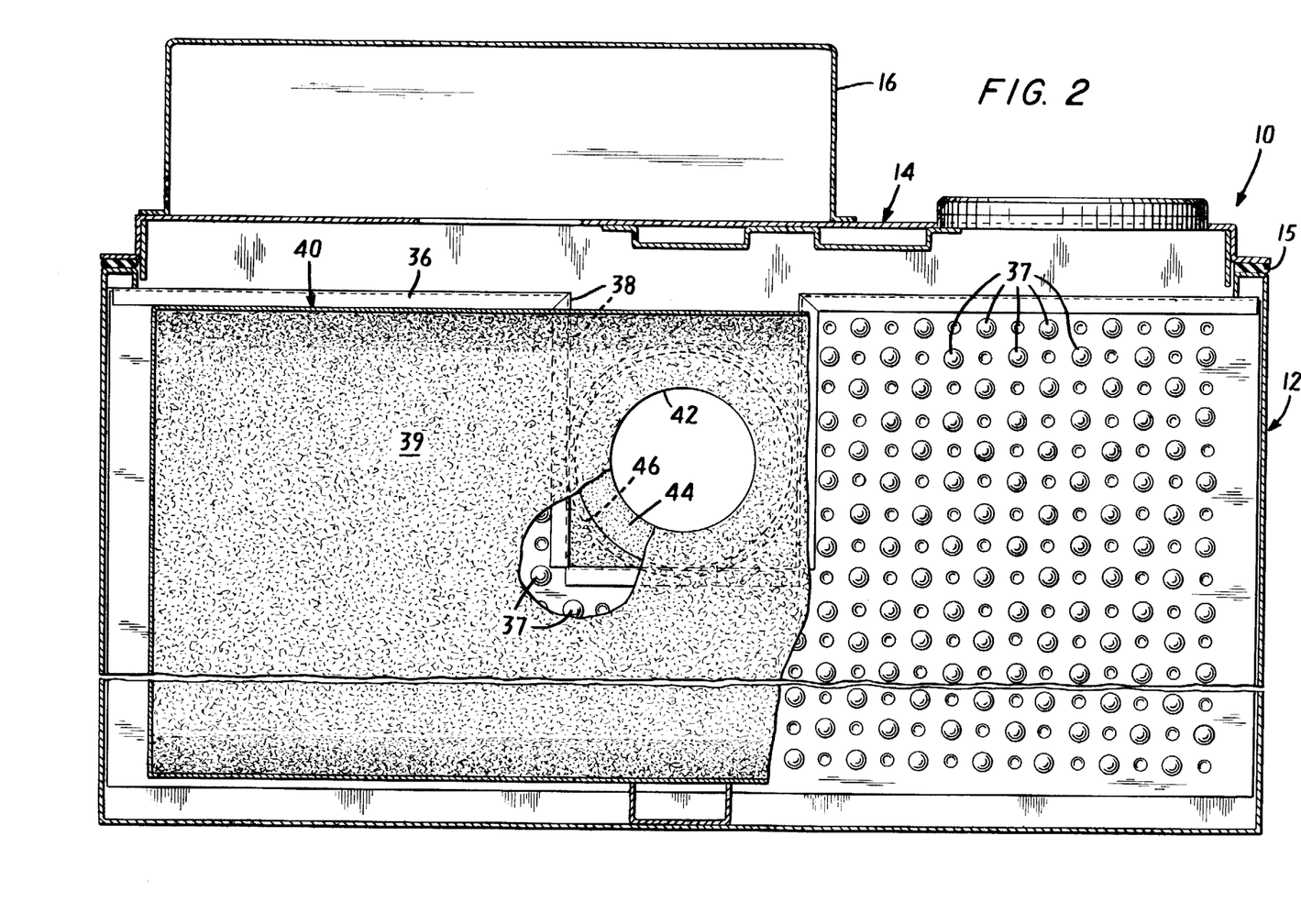
FIG. 2 is a side cross-sectional view of the filter of FIG. 1, the view being taken generally along the lines 2—2 of FIG. 1 and in the direction of the arrows.

The embodiment of the filter illustrated in FIGS. 1 and 2 of the drawings comprises a housing 10 in the form of a substantially rectilinear box composed of an open-topped body 12 and a removable cover 14, appropriate seals 15 being provided between the body and top of the container. The cover 14 also includes a plenum chamber 16 having one or more outlet openings 18.

An inlet opening 20 into the housing near the upper edge of one of the side walls of the body portion 12 of the housing communicates with a separator 22 that is mounted on hinges 24 at its lower end and is connected at its upper end to the upper part of the body 12 by a releasable coupling 26. The separator 22 has an inlet opening 28 near the upper end of its outwardly facing wall 30 for admission of the gas to be filtered. Upon entering the opening 28, the gas first flows downwardly through a section 31 of the separator 22 defined between the outer wall 30 and a baffle 32 and then flows upwardly in a section 33 defined between the inner wall 34 of the unit and the baffle 32 and finally enters the housing through a short conduit 35 on the upper end of the separator that extends through the housing inlet opening 20. The downward and then upward flow of gases through the sections of the separator 22 provides a dynamic separation of relatively large particles entrained in the gas flow, the particles being collected in the bottom of the separator. The separator is an optional accessory for use with a filter according to the present invention and may well be omitted in many applications.

The housing 10 of the filter is divided into a multiplicity of vertically oriented compartments by separator plates 36. In the embodiment shown in FIGS. 1 and 2, each of the separator plates 36 is a metal sheet formed with a multiplicity of uniformly, mutually spaced-apart protuberances 37, an equal number of which extend in a regular pattern in each direction away from the major plane of the separator plate. The separator plates 36 are equally spaced-apart and are rectangular. Each separator plate has a slot 38 extending in from its upper edge (see FIG. 2), the upper end of each slot 38 being open.

Each compartment in the housing receives a generally flat envelope 39 that is made of a material, usually a paper or fabric, that is permeable to gas but capable of capturing particles entrained in the gas to be filtered. All of the envelopes 39 are interconnected in stacked relation to form a filter element (designated generally by reference numeral 40) and except for those at the ends of the stack are identical in all respects. All of the envelopes are intercommunicated for gas distribution among them by aligned openings 42 in the top portions of the respective envelope walls. In the embodiment illustrated in FIGS. 1 and 2, the envelopes are spaced-apart a small distance by annular paperboard spacers 44 that are received between the adjacent facing walls of adjacent envelopes and surround the openings 42, each separator being adhesively or otherwise appropriately joined to the adjacent envelopes and thus physically interconnecting the envelopes. The left-most envelope illustrated in FIG. 1 differs from the remaining envelopes in that it has a communicating opening 42 only in its wall that is adjacent the next inwardly located envelope at the left but has no opening in the outwardly facing wall. The right-most envelope of the filter element has a seal element 46 in the form of an annular ring of substantially rigid material (for example, of paperboard or plastic). The seal element 46 has a flange portion 46a that defines a slot between it and the wall of the envelope.

As illustrated by the arrows in FIGS. 1 and 2, the gas to be filtered enters the filter element from the conduit 35 of the separator through the opening in the outer wall of the right-most envelope, which is the inlet opening to the filter element, and is distributed through the communicating openings 42 among the envelopes. Except for the inlet opening into the filter element 40, the filter element 40 is entirely closed, and therefore the only egress for the gases to be filtered entering the filter element is by way of flow through the envelope walls. The particles entrained in the gas are captured within the filter element. (An example of filtration of smoke in the filter is discussed in greater detail below.)

Upon flowing through the walls of the several envelopes, the filtered gases are able to flow relatively freely in the spaces between the several envelopes and the major surfaces of the separator plates 36, the protuberances 37 on the plates presenting minimal obstruction to free flow of filtered gases through the housing 10 and ultimate flow of such gases to the outlet plenum 16 and out of the housing 10 through the housing outlet opening 18.

The compartments in the housing defined by the separator plates 36 are open at the upper end; accordingly, a used filter element 40 may be readily removed by removing the removable cover 14. When in place in the housing, the filter element 40 is suspended on the lower edges of the slots 38 in the separator plates, the bottom portions of the spacers 44 between envelopes resting on such lower edges of the openings 38, and supported along the bottoms of the envelopes on the housing bottom or a part thereof.

It is, of course, important that any inlet conduit be coupled in sealed relation to the filter element 40. In the embodiments of FIGS. 1 and 2, the end of the short conduit 35 of the separator 22 has a sealing ring 48 that mates and forms a seal with the sealing ring 46 on the filter element 40. Meanwhile the flange 46a of the sealing ring 46 is partially overlapped by the edges of the opening 38 in the rightmost separator plate 36 so that the sealing ring 46 is supported for a moderate sealing force imposed between the respective sealing rings 46 and 48.

For removal of a filter element 40 from the housing 10, it is only necessary to remove the cover 14, loosen the separator 22 to disengage the respective sealing rings 46 and 48, and lift the filter element vertically out of the housing body 12.

Figure 3:
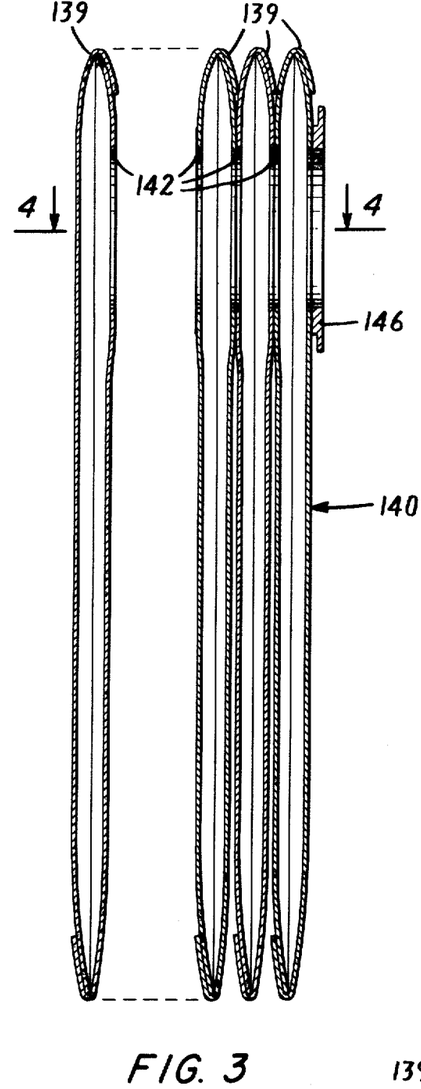
FIG. 3 is an end cross-sectional view of a filter element for the filter, the element being slightly modified from the one illustrated in FIGS. 1 and 2.
Figure 4:
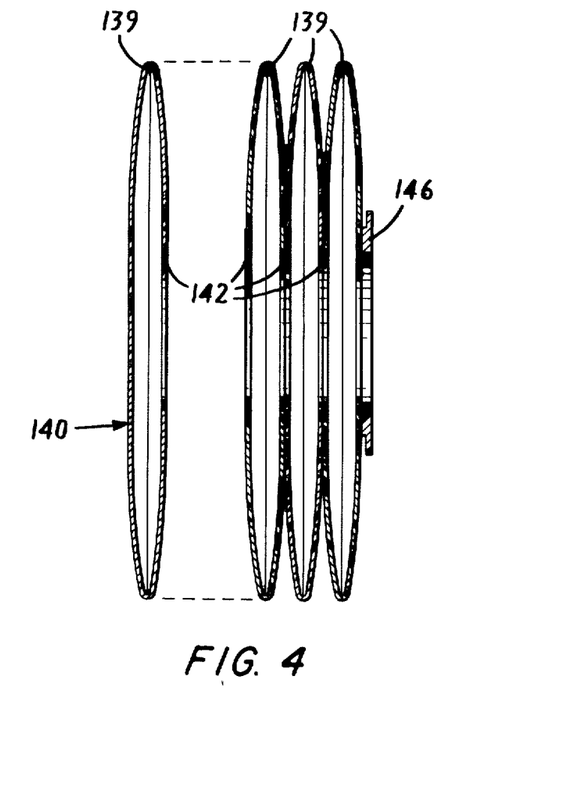
FIG. 4 is a top view in cross-section of the filter element of FIG. 3, the view being taken generally along the lines 4—4 and in the direction of the arrows in FIG. 3.

Numerous variations and modifications of the filter illustrated in FIGS. 1 and 2 are possible. For example, FIGS. 3 and 4 illustrate a modified form of filter element 140 which is substantially the same as the one illustrated in FIGS. 1 and 2 except that it does not include spacers between the several envelopes. Instead, each envelope 139 of the filter element 140 is connected to the adjacent envelopes by bands of adhesive (not visible in the drawings) that surround the respective openings 142, form seals around the openings and join the several envelopes together. The right-most envelope has a sealing ring 146.

Figure 5:
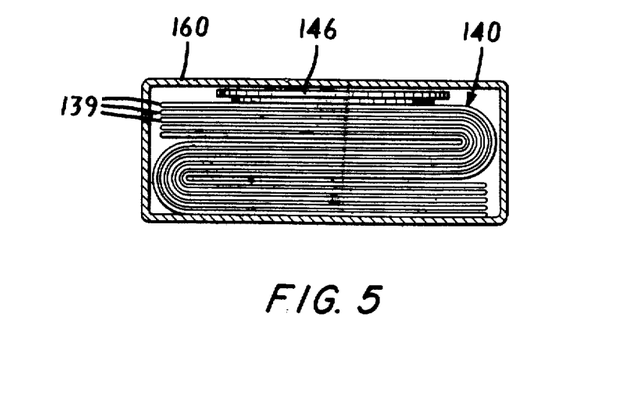
FIG. 5 is an end cross-sectional view of a filter element appropriately folded and contained in a shipping and storage carton.

The filter elements can be shipped and stored in flattened and folded condition as single replacement elements or groups of elements in cartons or bags. For example, FIG. 5 illustrates a folded filter element 140 (the form of FIGS. 3 and 4) received in a carton 160, that figure being included to emphasize the compact size of the filter element when stored and transported. When the filter element is pulled out to be received in the housing, the walls of the several envelopes mutually tend to separate. Moreover, the differential gas pressure across the walls of the envelopes of the filter element pushes the walls outwardly so that they engage the protuberances on the separator plates, thereby providing open spaces within the envelopes for accumulation of layers of particulate material on the envelope walls.

Figure 6:
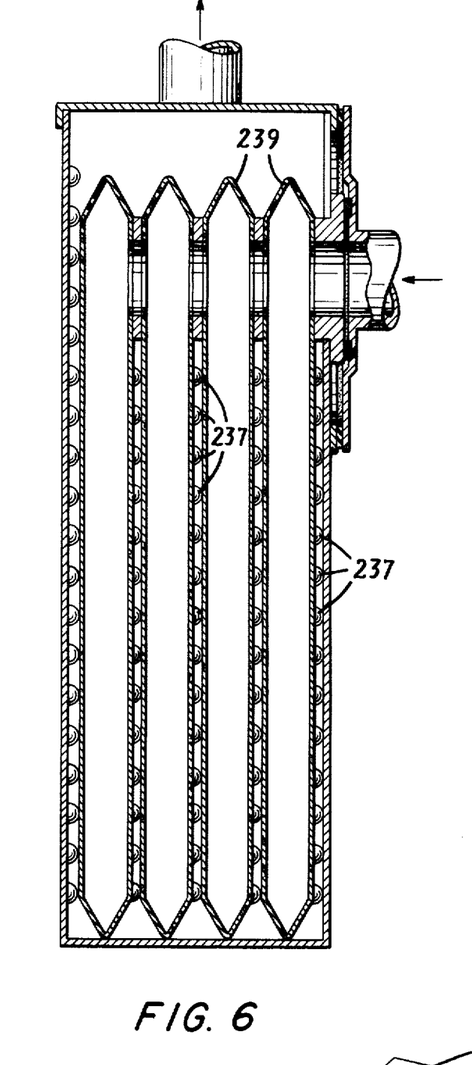
FIG. 6 is an end cross-sectional view of another embodiment that differs from the embodiment of FIGS. 1 and 2 principally in that it employs a filter element having separators formed in the filter envelopes themselves.
Figure 7:
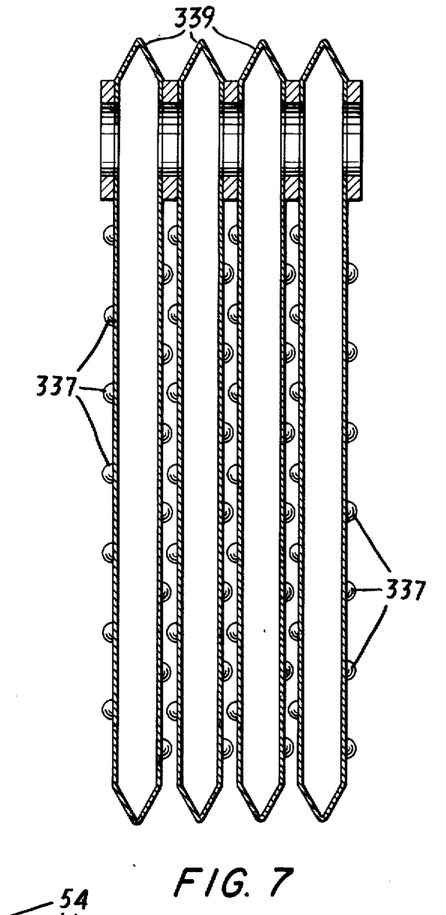
FIG. 7 is an end cross-section of a portion of a filter element that is generally the same as the one illustrated in FIG. 6 but embodying a modification.
Figure 8:
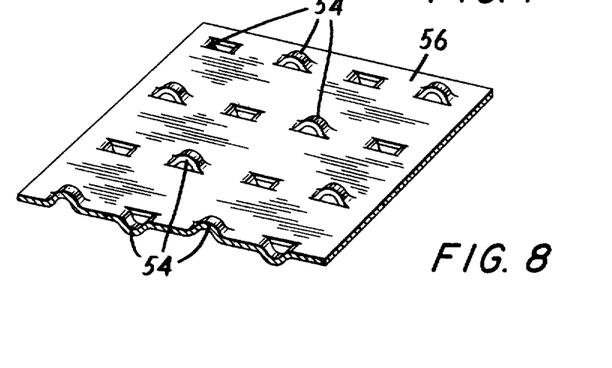
FIG. 8 is a pictorial view of a small piece of a separator plate for use in a filter of the type illustrated in FIGS. 1 and 2.

As illustrated in FIGS. 6 and 7, the separator plates associated with the housing of a filter may be replaced, functionally, by forming protuberances 237 on one wall of each envelope 239 (as illustrated in FIG. 6) or protuberances 337 on both walls of each envelope 339 (as illustrated in FIG. 7). If protuberances are formed on only one wall, they should be somewhat more closely spaced than if they are formed on both walls. As FIGS. 6 and 7 illustrate, each group of protuberances 237 or 337 on the respective walls of adjacent envelopes engage and support the major surfaces of the walls of the other envelope.

It is, of course, envisioned that filters, in accordance with the invention, may be made in a wide variety of sizes, shapes and capacities. For example, the number of envelopes of a filter element may vary quite widely, depending upon the desired capacity of the unit. Similarly, the construction of the housing, the nature of any of the seal arrangements porvided between the inlet opening to the filter element and the inlet conduit for conducting gases to the filter may take various forms. The construction of the separator plate may range from solid plates having generally dome-like protuberances (as illustrated in FIGS. 1 and 2) or small U-shaped bands 54 projecting in opposite directions from a sheet 56, as illustrated in FIG. 7, to corrugated plates or screens, and so forth. In general, however, it is desirable that the number, spacing and geometric form of any protuberances, corrugations or other forms of separating devices be such that the extent of surface engagement between the separating devices and the walls of the several envelopes is limited to ensure maximum utilization of the surface areas of the envelope walls for filtration. Similarly, it is desirable to keep the spaces between the envelopes as free of restrictions on flow as possible to limit flow losses in the filter.

In addition to modifications in the geometry, dimensions, materials and forms of construction of the housing and the filter element, the nature of the materials used for the filter element may vary widely, depending upon the nature of the particulate materials to be removed from the gas. There is, of course, a substantial body of technology relating to the filtration of particulate material from gases.

The pressure differential across the walls of the envelopes of the filter elements may be created by (1) establishing a pressure above atmospheric within the filter element (i.e., by blowing the gas to be filtered into the filter element), (2) establishing a pressure below atmospheric in a closed housing of the filter (i.e., by sucking filtered gases from the housing) or (3) by both blowing and sucking. It is evident that sucking requires a closed, sealed housing, whereas blowing does not. Indeed in a pressure delivery of gas to the filter element, a housing is not an essential element, although a housing is preferred for protection of and mechanical mounting for the filter element. A suction system will often be preferred from the standpoint of pump or blower life, since a vacuum pump or blower on the downstream side of a filter is drawing filtered gas, whereas a pressure blower on the upstream side is drawing contaminated gas.

It has been found that it is desirable to maintain a very low particle velocity in a filter according to the invention, at least when very small particles, such as smoke solids, are involved. Considering smoke solids as an example, and in particular smoke solids derived from arc-welding, the sizes of the smoke particles, which are for the most part metal oxides, range generally from about 0.1 to 0.5 microns. A filter capable of trapping such small-sized particles is highly susceptible to penetration of the particles into the interstices of filter element material. Such tendency for the particles to penetrate and thereby close the interstices of the filter element material and clog the filter can be substantially eliminated by maintaining a particle velocity at the face of the envelope walls of on the order of one foot per minute. At such very slow velocities of approach of the particles toward the surfaces of the envelopes walls, the particles simply very lightly settle on the surface of the filter medium.

It has also been found desirable to use for the filter element a material that has a significant amount of permeability to the smoke particles. It is virtually impossible to grade papers and cloths of the low micron size range, since the pore sizes are so small and so variable in size, in any event, to be nearly unmeasurable on any meaningful basis. As a preliminary test for selecting a filter element material, it has been found that many possible materials can be selected on the basis of a capability of passing one cubic foot of air per minute through each square foot of material with a pressure loss of not in excess of about 50 to 60 inches of water. Among the grades of paper that have been found to be quite satisfactory for filtering the smoke from an arc-welding operation are the following:

Rochester Paper Company Grades Nos. 1109-006, 1109-008, 1137-20 and 1153-15;
Strathmore Paper Company Grades Nos. 340 and 8539.

In general, proper selection of an appropriate filter element material is a matter of testing for the conditions involved.

It is believed that it is not necessary in smoke filtration, if the approach velocity of particles to the walls of the filter element is sufficiently small, to employ filter paper but that a general purpose paper appropriate for smoke filtration can be found through experimentation. As mentioned previously, it appears that what is important is not so much the nature of the filter element material but the maintenance in operation of the filter of a low particle velocity at approach to the surface of the material to ensure against any significant penetration of the smoke particles into the interstices of the material.

The light settlement of smoke particles onto the material progressively builds a bed of smoke particles on the surface. During an initial period of operation of a filter with a new filter element used to remove smoke solids derived from an arc-welding operation, that period usually lasting on the order of one to five minutes, visible smoke is emitted from the outlet of the filter. Meanwhile, it is observed through test viewing ports that during that initial period the inner wall of an envelope gradually darkens, which is indicative of the development of a layer of smoke solids. After the initial start-up period, the smoke condition relatively quickly disappears, thus indicating that the accumulated thin layers of smoke particles on the surfaces of the filter element envelopes have begun to operate as a filter bed, in that smoke particles are thereafter trapped on the surfaces of the previously accumulated layers of smoke particles. After the initial start-up period and the development of filter beds on the surfaces of the envelope walls, no visible smoke emanates from the outlet of the filter.

An indication of the fact that smoke particles do not penetrate into the filter element material with the low particle approach velocity is the observed lack of any tendency for any significant clogging of the filter medium to occur. Layers of on the order of 3/64 inch in thickness have been developed in an experimental filter element used for filtering arc-welding smoke. A test unit having a total effective envelope wall surface of 60 square feet has collected approximately 5 pounds of smoke solids derived from approximately 480 pounds of weld wire.

Other experiments have demonstrated that a deposit of smoke particles formed on the surface of a filter medium at a particle approach velocity of on the order of 1 foot per minute may be brused from the filter element walls and that same filter element can be reused without any material change in filtering effectiveness or in pressure drop across it. This is a strong indication that only a very minimal amount of penetration of smoke particles into the interstices of the filter element material occurs. In other words, in the initial phases of filtering with a new filter element, either the particles flow through the material or they are caught on the surface and gradually build bridges across the openings at the surface of the material due to the slow, gentle movement of the material due to the slow, gentle movement of the particles toward the envelope walls.

EXAMPLE

A filter constructed substantially in accordance with the embodiment illustrated in FIGS. 1 and 2 of the drawings has been employed in removing smoke solids from smoke generated by an arc-welding gun, the smoke being withdrawn from the environs of the weld site through a smoke extraction type of gun and delivered through a conduit to the inlet of the separator at a rate of approximately 60 cubic feet per minute. The collection of smoke from a welding operation should be not less than about 35 cubic feet of air per minute and not in excess of about 80 cubic feet per minute. Below the lower amount, the smoke is not being very effectively removed. Above the higher amount, the flow of gases into the collector on the gun tends to reduce the shielding efficiency at the welding site. A filter element composed of 16 envelopes providing a total filter area of approximately 60 square feet is made from one of the paper grades previously mentioned. The vacuum pump, which has a capacity of 60 cubic feet per minute at a vacuum of about 50 inches water, is located on the downstream side of the filter and draws smoke from the environs of the welding site into the smoke extractor associated with the gun, through a conduit, through the separator and into the filter at the rate of about 50 cubic feet per minute with a vacuum of about 54 inches water at the filter intake and a maximum pressure drop in the filter of about four inches water near the end of the useful life of the filter element. At 60 cubic feet per minute with a filter medium area of 60 square feet, the theoretical approach velocity of particles is on the order of one foot per minute.

After a few minutes, usually about five minutes, of operation of a new filter element, the visible smoke initially emitted from the outlet of the vacuum pump rapidly disappears so that no visible smoke is observed. For the remaining useful life of the filter element, a layer or bed of smoke particles builds up on each wall of each of the filter envelopes. It has been found that a bed can be built to a thickness of approximately 3/64 of an inch on each wall. At that thickness, the total solids collected in the filter element is about five pounds. In the course of trapping five pounds of smoke solids in the filter, approximately 480 pounds of flux-cored type electrode are consumed. The pressure drop across the filter after one hour of operation of a new filter element is approximately one inch water. It takes about 21 hours of active arc time to collect five pounds of smoke solids in the filter element, and about 480 pounds of flux-cored, 3/32 inch diameter electrode is consumed. The final pressure drop across the filter at the end of 21 hours is about four inches water. There is some reduction in flow rate during the life of the filter, the flow rate beginning at approximately 50 cubic feet per minute and being approximately 45 cubic feet per minute after 21 hours of operation.

When a filter element should be replaced is variable and depends upon the conditions of a particular filtering operation, the desired quality of filtering and numerous other factors. Accordingly, it is inappropriate to ascribe any useful life to a filter. In a welding operation, it is believed that a service time, measured in terms of welding electrode consumed in a welding operation, of 500 to 600 pounds is appropriate. In a usual production line operation this is about the amount of weld wire that is consumed in about a 25 hour active arc time.

The above-described embodiments and example of the invention are intended to be merely exemplary, and those skilled in the art will be able to make numerous variations and modifications of the embodiments and example without departing from the spirit and scope of the invention. All such variations and modifications are intended to be included in the scope of the invention as defined in the appended claims.

We claim:

1. A filter for filtration of a gas to remove particulate material therefrom comprising a housing; a filter element supported in the housing, the filter element including a multiplicity of generally flat, closed envelopes of a material that is permeable to gas but capable of capturing particles entrained in the gas, an inlet opening in at least one of the envelopes of the filter element for admission of the gas to be filtered into the interior thereof, means communicating the interiors of the envelopes with each other for distribution of the gas to be filtered among the interiors of the several envelopes, and means joining the envelopes together with the faces thereof at least partly in generally adjacent relation; means for maintaining the major portions of the external surfaces of the walls of the envelopes in spaced relation to provide flow passages between adjacent envelopes of the filter element for the flow of filtered gas through and away from the spaces between the envelopes, said means for maintaining the adjacent envelopes in spaced relation including separator plates mounted in spaced relation in the housing, at least one separator plate being disposed between each adjacant pair of envelopes and having spaced-apart protuberances engageable by the respective walls of adjacent envelopes; and means for conducting gas to be filtered into the filter element through the inlet opening thereof.

2. A filter according to claim 1 wherein the protuberances are small generally dome-like bosses.

3. A filter according to claim 1 wherein the protuberances are small generally U-shaped bands.

4. A filter according to claim 1, wherein the separator plates are in substantially parallel relation to define compartments in the housing, each such compartment receiving one of the multiplicity of envelopes and the compartments having a width appropriate to permit expansion of each envelope to provide an interior space therein for development and retention of a layer of particles captured from the gas on the interior of each wall of the envelope.

5. A filter according to claim 1 wherein the means for conducting the gas to be filtered into the filter element includes a substantially rigid annular sealing ring extending around the inlet opening of the filter element and an inlet conduit engaged in sealing relation with the sealing ring of the filter element inlet opening.

6. A filter according to claim 5 and further comprising a housing receiving the filter element and wherein the housing includes means for receiving the sealing ring of the filter element and holding it in a position for sealing engagement by the sealing ring of the conduit.

7. A filter according to claim 1 wherein each envelope includes a pair of mutually facing, substantially mmatching wall panels interconnected entirely around the perimeter to define a closed interior space.

8. A filter according to claim 7 wherein the envelopes are joined with the wall panels located generally in parallel planes.

9. A filter according to claim 8 wherein all of the envelopes of the filter element are substantially identical and are joined together with their perimeters in substantially matching relation.

10. A filter according to claim 8 wherein the means communicating the interiors of the several envelopes with each other includes matching openings in the adjacent wall panels of adjacent envelopes and wherein the means joining the panels includes connector means extending around the perimeters of the openings.

11. A filter according to claim 10 wherein the connector means between adjacent envelopes includes a band of an adhesive.

12. A filter according to claim 10 wherein the connector means includes an annular spacer element interposed between the wall panels of adjacent envelopes.

* * * * *